United States Patent
Le Doux et al.

(10) Patent No.: US 10,599,284 B2
(45) Date of Patent: Mar. 24, 2020

(54) THREE-DIMENSIONAL DIGITAL MODELING WITH TWO-DIMENSIONAL CANVAS

(71) Applicant: Microsoft Technology Licensing, LLC, Redmond, WA (US)

(72) Inventors: Adam Ross Le Doux, Seattle, WA (US); Alexandre Gueniot, Mountain View, CA (US); Bharat Kumar Ahuja, Bellevue, WA (US); Jie Li, Bellevue, WA (US); Jordan Krissi, Seattle, WA (US); Matthew William Kernek, Seattle, WA (US); Michael Alexander Fuller, Redmond, WA (US); Onur Onder, San Jose, CA (US); Ramya Tridandapani, Sunnyvale, CA (US); Constance Worsfold Gervais, Seattle, WA (US); Garrett William Brown, Duvall, WA (US); Michael Jay Gilmore, Bothell, WA (US); Tyler Robert Adams, Seattle, WA (US); Thomas R. Mignone, Seattle, WA (US); Stephanie Lorraine Horn, Bellevue, WA (US); Eric Minghai Gao, Mountain View, CA (US); Heather Joanne Alekson, Vancouver (CA); Chris Welman, Vancouver, CA (US); Thomas Nhan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 15/713,431

(22) Filed: Sep. 22, 2017

(65) Prior Publication Data

US 2018/0314405 A1     Nov. 1, 2018

Related U.S. Application Data

(60) Provisional application No. 62/492,848, filed on May 1, 2017.

(51) Int. Cl.
*G06T 11/60*     (2006.01)
*G06F 3/0481*    (2013.01)
(Continued)

(52) U.S. Cl.
CPC .......... *G06F 3/04815* (2013.01); *G06T 11/60* (2013.01); *G06T 15/205* (2013.01);
(Continued)

(58) Field of Classification Search
CPC .. G06F 3/04815; G06F 3/04845; G06T 11/20; G06T 11/60; G06T 15/00;
(Continued)

(56) References Cited

U.S. PATENT DOCUMENTS 5,745,910 A * 4/1998 Piersol ................. G06F 17/22
                                                715/210
6,346,938 B1   2/2002 Chan et al.
(Continued)

FOREIGN PATENT DOCUMENTS

EP   0635808 A2   1/1995
EP   2706447 A2   3/2014

OTHER PUBLICATIONS

"Interacting with 3D PDFs", Retrieved from <<https://web.archive.org/web/20130603094440/https://www.bluebeam.com/us/bluebeam-university/pdf-tutorials/revu-11/3d-viewing.pdf>>, Jun. 3, 2013, pp. 1-6.
(Continued)

*Primary Examiner* — Rinna Yi
(74) *Attorney, Agent, or Firm* — Goff IP Law PLLC; Jared Goff

(57) ABSTRACT

A three-dimensional model can be presented in a two-dimensional digital canvas on a computer display. User input (Continued)

directed at the three-dimensional model in the two-dimensional canvas can be received. The three-dimensional model can be manipulated in response to the user input. A two-dimensional view of the three-dimensional model can be displayed. Corresponding data structures for the model, the canvas, and the two-dimensional objects in the data structure can be maintained and updated. One or more additional techniques can also be utilized in a computer system, such as continuous user-controlled model rotation in a two-dimensional canvas; viewport autofit and non-autofit modes; rotating the model around a camera look-at point; ghosting outside the viewport; normalizing modeling units and values; preset buttons with on-button previews; user-defined view presets; and/or two-dimensional image substitution.

20 Claims, 10 Drawing Sheets

(51) Int. Cl.

| | | |
|---|---|---|
| *G06T 15/20* | (2011.01) | |
| *G06T 19/20* | (2011.01) | |
| *G06F 3/0482* | (2013.01) | |
| *G06F 3/0484* | (2013.01) | |
| *G06T 15/50* | (2011.01) | |

(52) U.S. Cl.
CPC ............ *G06T 19/20* (2013.01); *G06F 3/0482* (2013.01); *G06F 3/04845* (2013.01); *G06T 15/50* (2013.01); *G06T 2200/24* (2013.01); *G06T 2210/62* (2013.01); *G06T 2219/028* (2013.01); *G06T 2219/2016* (2013.01); *G06T 2219/2024* (2013.01)

(58) Field of Classification Search
CPC ......... G06T 17/00; G06T 19/00; G06T 19/20; G06T 2219/2016
See application file for complete search history.

(56) References Cited

U.S. PATENT DOCUMENTS

| | | | | |
|---|---|---|---|---|
| 7,423,655 | B1* | 9/2008 | Stephens | G06T 11/00 345/619 |
| 7,576,756 | B1* | 8/2009 | Good | G06F 3/0481 345/635 |
| 7,739,623 | B2 | 6/2010 | Liang et al. | |
| 7,999,807 | B2 | 8/2011 | Petschnigg et al. | |
| 8,464,170 | B2 | 6/2013 | Petschnigg et al. | |
| 2005/0097465 | A1* | 5/2005 | Giesen | G06F 3/0481 715/700 |
| 2011/0246875 | A1* | 10/2011 | Parker | G06F 3/04845 715/702 |
| 2012/0221383 | A1 | 8/2012 | Shore | |
| 2013/0222385 | A1 | 8/2013 | Dorsey et al. | |
| 2015/0058710 | A1 | 2/2015 | Atkinson et al. | |
| 2015/0093029 | A1 | 4/2015 | Tijssen | |
| 2016/0034150 | A1 | 2/2016 | Behr et al. | |
| 2016/0344946 | A1 | 11/2016 | Michalik | |
| 2016/0379419 | A1 | 12/2016 | Khalili et al. | |
| 2017/0143494 | A1 | 5/2017 | Mahfouz | |
| 2018/0315238 | A1 | 11/2018 | Le doux et al. | |

OTHER PUBLICATIONS

"Modify objects using graphics frames", Retrieved from <<https://helpx.adobe.com/indesign/using/frames-objects.html>>, Feb. 15, 2017, 16 Pages.

Farshad, "ThreeDify 3Doffice: Insert and Create 3D Designs From MS Office Applications", Retrieved from <<http://www.free-powerpoint-templates.com/articles/threedify-3doffice-insert-and-create-3d-designs-from-ms-office-applications/>>, Apr. 28, 2017, 12 Pages.

J., Robin, "Embed 3D models on website", Retrieved from <<http://techqa.info/programming/question/7107778/embed-3d-models-on-website>>, Aug. 18, 2011, 9 Pages.

Jones, Brad, "Microsoft demonstrates 3D integration planned for Windows 10 Creators Update", Retrieved from <<http://www.digitaltrends.com/computing/paint-powerpoint-3d-windows-update/#ixzz4fpOAzMDB>>, Oct. 26, 2016, 5 Pages.

Sartain, JD, "7 PowerPoint text effects for snazzier slides", Retrieved from <<http://www.pcworld.com/article/2897203/software-productivity/7-powerpoint-text-effects-for-snazzier-slides.html>>, Apr. 15, 2015, 8 Pages.

"How Do I Create a 3D Object in Microsoft Word?", Retrieved from <<https://www.techwalla.com/articles/how-do-i-create-a-3d-object-in-microsoft-word>> on Apr. 25, 2017, 8 Pages.

"Navigation tools", Retrieved from <<http://help.autodesk.com/view/fusion360/ENU/?guid=GUID-810B33B3-4E8E-4E18-89D6-02AFF71FF630> on Apr. 25, 2017, 1 Page.

"How to use Microsoft's Paint 3D: Creating cool 3D scenes has never been so much fun", Retrieved from <<https://www.pcworld.com/article/3163631/windows/how-to-use-microsofts-paint-3d-creati%E2%80%A6>> on Apr. 25, 2017, 9 Pages.

"3d mouse orbit center—Autodesk Community", Retrieved from <<https://forums.autodesk.com/t5/fusion-360-design-validate/3d-mouse-orbit-center/td-p/6832032>> on Apr. 25, 2017, 4 Pages.

"WordArt Tools—Publisher", Retrieved from <<https://support.office.com/en-us/article/WordArt-Tools-EB0E6DDC-D9FF-4D4A-859F-FA28E5AD2D00>> on Apr. 25, 2017, 12 Pages.

"Inkscape", Retrieved from: https://web.archive.org/web/20160418231305/http://en.flossmanuals.net/booki/inkscape/inkscape.pdf, Oct. 5, 2011, 152 Pages.

"Non Final Office Action Issued in U.S. Appl. No. 15/713,392", dated Dec. 10, 2018, 12 Pages.

Herman, et al., "Graph visualization and navigation in information visualization: A survey", In Proceedings of IEEE Transactions on visualization and computer graphics, vol. 6, No. 1, Jan. 2000, 20 Pages.

"International Search Report and Written Opinion Issued in PCT Patent Application No. PCT/US2018/026772", dated Nov. 6, 2018, 20 Pages.

"Notice of Allowance Issued in U.S. Appl. No. 15/713,392", dated Apr. 10, 2019, 9 Pages.

"Non Final Office Action Issued in U.S. Appl. No. 16/670,994", dated Feb. 4, 2020, 23 Pages.

\* cited by examiner

SOFTWARE 180 IMPLEMENTING THREE
DIMENSIONAL MODELS IN TWO DIMENSIONAL
CANVASES

THREE-DIMENSIONAL DIGITAL MODELING WITH TWO-DIMENSIONAL CANVAS

RELATED APPLICATIONS

The present application is a non-provisional application that claims the filing date of U.S. Provisional Application No. 62/492,848, filed May 1, 2017, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

Some computer applications, such as productivity applications (e.g., digital spreadsheet applications, digital slide presentation application, digital word processing applications, and email applications) are based on the concept of a two-dimensional canvas upon which two-dimensional objects are displayed and manipulated. Such applications typically only support two axes for content (such as x and y axes, but no z axis).

Some three-dimensional models have been generated and manipulated in the two-dimensional canvas of such applications. Such modeling has allowed use of preset buttons that can be selected to position a generated model into particular preset orientations. Such modeling has also allowed views of the three-dimensional models to be included in operations with two-dimensional objects in the two-dimensional canvas, such as aligning, text wrapping, and moving forward and backward in a series of view overlay settings (such as moving one object behind another in a view, so that the object in front partially hides the object that is behind).

SUMMARY

It has been found that the capabilities of existing three-dimensional modeling for use with two-dimensional digital canvases has been limited. It has been found that the use of one or more tools or techniques can improve a computer system's presentation and manipulations of three-dimensional models, such as in a two-dimensional digital canvas that is displayed on a display of the computer system.

In one aspect, the tools and techniques can include maintaining a two-dimensional digital canvas data structure, with the canvas data structure representing a two-dimensional digital canvas. One or more data structures representing one or more two-dimensional visual objects in the two-dimensional canvas can be maintained. Also, a three-dimensional model data structure representing a three-dimensional model located in the two-dimensional canvas can be maintained. The three-dimensional model can be presented in the two-dimensional canvas on a computer display. User input directed at the three-dimensional model in the two-dimensional canvas can be received, and the three-dimensional model can be manipulated in response to the user input. The three-dimensional model data structure can be updated to represent the manipulating in response to the user input. A two-dimensional view of the three-dimensional model can be displayed. The canvas data structure can be updated to represent the manipulating in response to the user input.

In the basic technique discussed above, one or more tools and techniques can be utilized, such as continuous user-controlled model rotation in a two-dimensional canvas; viewport autofit and non-autofit modes; rotating the model around a camera look-at point; ghosting outside the viewport; normalizing modeling units and values; preset buttons with on-button previews; user-defined view presets; and/or two-dimensional image substitution.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
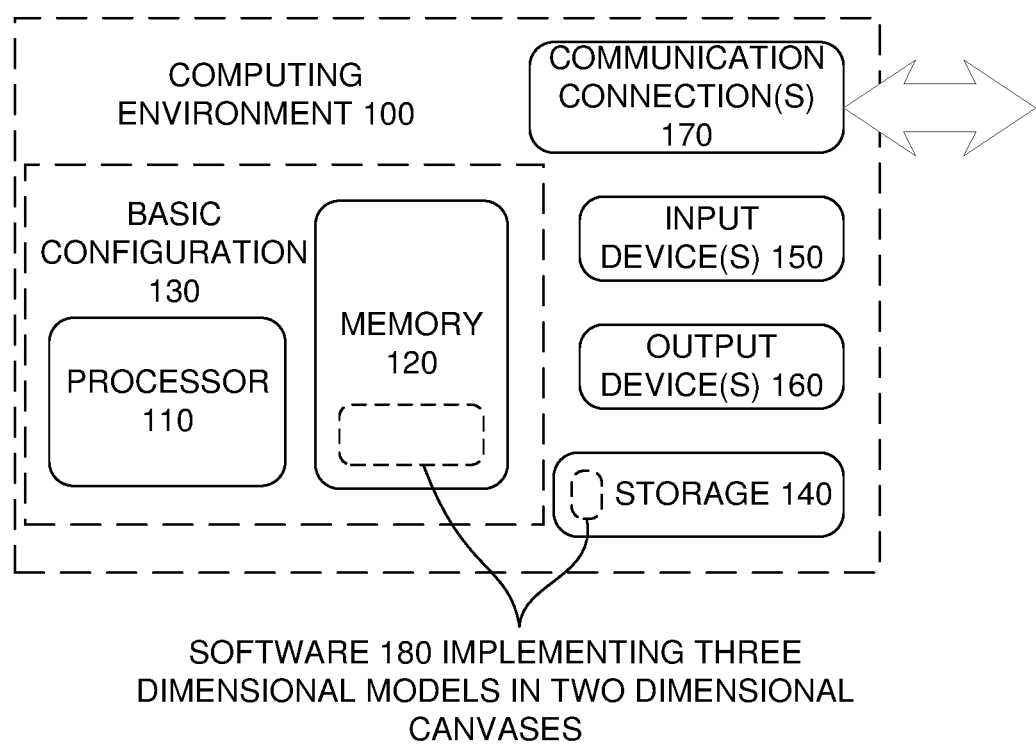
FIG. 1 is a block diagram of a suitable computing environment in which one or more of the described aspects may be implemented.

Aspects described herein are directed to techniques and tools for improved presentation and manipulations of three-dimensional models, such as in a two-dimensional digital canvas that is displayed on a display of the computer system. Such improvements may result from the use of various techniques and tools separately or in combination.

Such techniques and tools may include presenting the three-dimensional model within a viewport that is maintained by the computer system as a two-dimensional object in a two-dimensional canvas. As used herein, two-dimensional objects refer to digital two-dimensional visual objects. As used herein, a canvas is a two-dimensional digital workspace within which the computer system maintains and manipulates two-dimensional objects to be displayed in the canvas. For example, a canvas may be a page of a word processing document in a word processing application, a spreadsheet in a spreadsheet application, a slide in a slide presentation application, a page for a body of an email in an email application, or a page of a note in a note-taking application. Continuous real-time rotation and other manipulations of the three-dimensional model can be performed through the viewport in the two-dimensional canvas, which may be a bounded canvas. For example, other types of manipulations may include zooming and panning.

Additionally, the viewport can be manipulated in two-dimensional manipulations with other two-dimensional objects in the two-dimensional canvas. For example, such two-dimensional manipulations may include moving two-dimensional objects in front of or behind other objects for viewing in the canvas, automated positioning of two-dimensional objects relative to each other (e.g., aligning or spacing), and application of two-dimensional object properties such as two-dimensional borders to the two-dimensional objects. All these uses of the three-dimensional model can improve the computer system's ability to effectively display and manipulate digital three-dimensional models in two-dimensional canvases, thereby improving the capability of and effectiveness of the computer system in working with two-dimensional digital objects and three-dimensional digital models. However, one or more of the tools and techniques discussed herein may be used in modeling without a two-dimensional canvas.

The computer system can generate and render digital images representing views of the three-dimensional model in the viewport. For example, such an image may be saved to computer storage within a file containing the canvas, as part of an operating saving the file itself. When the file is loaded and the canvas is displayed, the image of the model view can be loaded, rather than loading and rendering the three-dimensional model. The computer system can delay loading the three-dimensional model until user input directed at the image is received, indicating that the three-dimensional model represented by the image is to be manipulated. By generating and using such a digital image of the last saved view of the three-dimensional model, the computer system can avoid the use of computer resources that would have been used in loading and rendering the three-dimensional model, thereby improving efficiency of the computer system.

The computer system can apply model ghosting to a displayed view of the three-dimensional model outside of a viewport during manipulations. As used herein, model ghosting refers to displaying a non-ghosted view of a portion of the three-dimensional model whose view is located within a viewport in the canvas, and generating and displaying a ghosted view of a portion of the three-dimensional model whose view is located outside the viewport in the canvas, with a texture of the ghosted view being different from a texture of the non-ghosted view. For example, such model ghosting may be applied in real time while receiving continuous user input and manipulating the model and the display in real time (real time means appearing near actual real to a user time on a computer display, such as five or more frames per second, ten or more frames per second, or twenty or more frames per second (e.g., at a frame rate of thirty frames per second)). Using such model ghosting as discussed herein provides an effective technique for displaying which portions of a displayed three-dimensional model will be displayed in the viewport and which portions will not be displayed, while the three-dimensional model is being manipulated. This can avoid problems that are specific to computer systems displaying digital features in viewports, such as failing to provide a view of a portion of a model that is outside the viewport, or failing to illustrate which portions of a model are outside the viewport and which portions are inside the viewport while the model is being manipulated. Accordingly, the three-dimensional model ghosting can provide a more effective graphical user interface for manipulating three-dimensional models viewed through viewports, and can thereby improve the usability of the computer system.

As another example, three-dimensional scene properties can be converted to normalized units, and normalized values using those normalized units can be displayed to users. The normalized units can also be used in performing operations for manipulating and displaying three-dimensional models in the two-dimensional canvas, rather than using physical units from the two-dimensional canvas or physical units from the three-dimensional model. For example, the normalized units can be based on a size (such as a length) of the three-dimensional model, so that each value in the normalized units represents a percentage of that size. This unit mapping can avoid computational problems that can occur in computer systems when using very small or very large numbers, such as overflow errors and inordinately large errors of approximation. Additionally, using units that are neither physical units of the canvas or display, or physical units of the three-dimensional model, can avoid confusion that can result from the differences between actual sizes of displays and the unit values of three-dimensional models. For example, a three-dimensional model may have dimensions indicating the model is one hundred meters long, but it may be displayed in a viewport that is 5 centimeters by 5 centimeters on a computer display. In this case, for example, if the computer system displays a value representing a distance of a camera from the model, it may not be clear whether that distance is in terms of the units of the three-dimensional model, units of the canvas, or units based on dimensions of a physical computer display upon which the canvas is being displayed. Using normalized units can avoid this confusion, which could otherwise be introduced by the features of computer displays and computer modeling, and thereby provide a more effective computer system.

As another example of tools and techniques discussed herein, the viewport for the three-dimensional model can be resized to fit a two-dimensional view of the three-dimensional model as the model is manipulated. For example, this resizing may be done automatically by the computer system as part of manipulating the three-dimensional model. This can avoid an issue that can arise in computer systems when manipulating a three-dimensional model that is viewed through a viewport, where the manipulation would otherwise cause a portion of the model to be outside the viewport (and therefore hidden from view). By automatically resizing the viewport using the computer system, the whole three-dimensional model can continue to be viewed through the viewport, even if a portion of the model would have gone outside the viewport if the viewport had remained its original size. The computer system may switch between an autofit mode wherein the automatic resizing is performed, and a non-autofit mode where this automatic resizing is not performed. For example, the non-autofit mode may be engaged when panning or zooming. To avoid inadvertent movement of the model when switching modes, a look-at point of a camera in a three-dimensional scene used to display the model can be maintained at a fixed point relative to the center of the viewport (such as at the center itself). Accordingly, these features can result in a more effective computer system for displaying three-dimensional models through viewports in two-dimensional canvases, and can provide a more effective graphical user interface for manipulating three-dimensional models such as those viewed through viewports, and can thereby improve the usability of the computer system.

As another example, when performing rotating manipulations, the three-dimensional model can be rotated around a point, rather than rotating a camera around the model in a three-dimensional scene used to display the model. This may include freely rotating the model around multiple rotational axes in a single manipulation. The rotation of the model rather than rotating the camera can aid in automatically interpolating between different rotational positions—such as automatically interpolating between a rotational orientation of the model in one presentation slide to a different rotational orientation of the model in the next presentation slide. If the camera position were used for such interpolating, then linearly interpolating between a camera position on one side of the model to a camera position on another side of the model would pass the camera through the model—a typically undesirable result that is specific to computer modeling. However, if the model is rotated instead, then interpolating between the two positions can include linearly varying between a first set of angles for the model to a second set of angles for the model. Additionally, if the camera and lights are maintained in the same position when rotating the model, then good lighting from the perspective of the camera can be maintained with different rotational positions of the model. In contrast, if the camera were rotated around a model and the lighting were kept in the same positions in the three-dimensional scene, then the lighting would change and likely often be poor quality as the camera rotated around the model. Accordingly, the rotation of the model itself in the three-dimensional scene can avoid computer-modeling specific issues that arise when manipulating a three-dimensional model in a three-dimensional scene, and can provide a more efficient and effective graphical user interface for manipulating three-dimensional models such as those viewed through viewports, and can thereby improve the usability of the computer system.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a client computer device and/or a server computer system. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing three-dimensional digital models in a two-dimensional canvas. An implementation of three-dimensional digital models in a two-dimensional canvas may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level descriptions for operations performed by a computer, and should not be confused with acts performed by a human being, unless performance of an act by a human being (such as a "user") is explicitly noted. The actual computer operations corresponding to these terms vary depending on the implementation.

II. Computer System for Three-Dimensional Modeling in a Two-Dimensional Canvas

Figure 2:
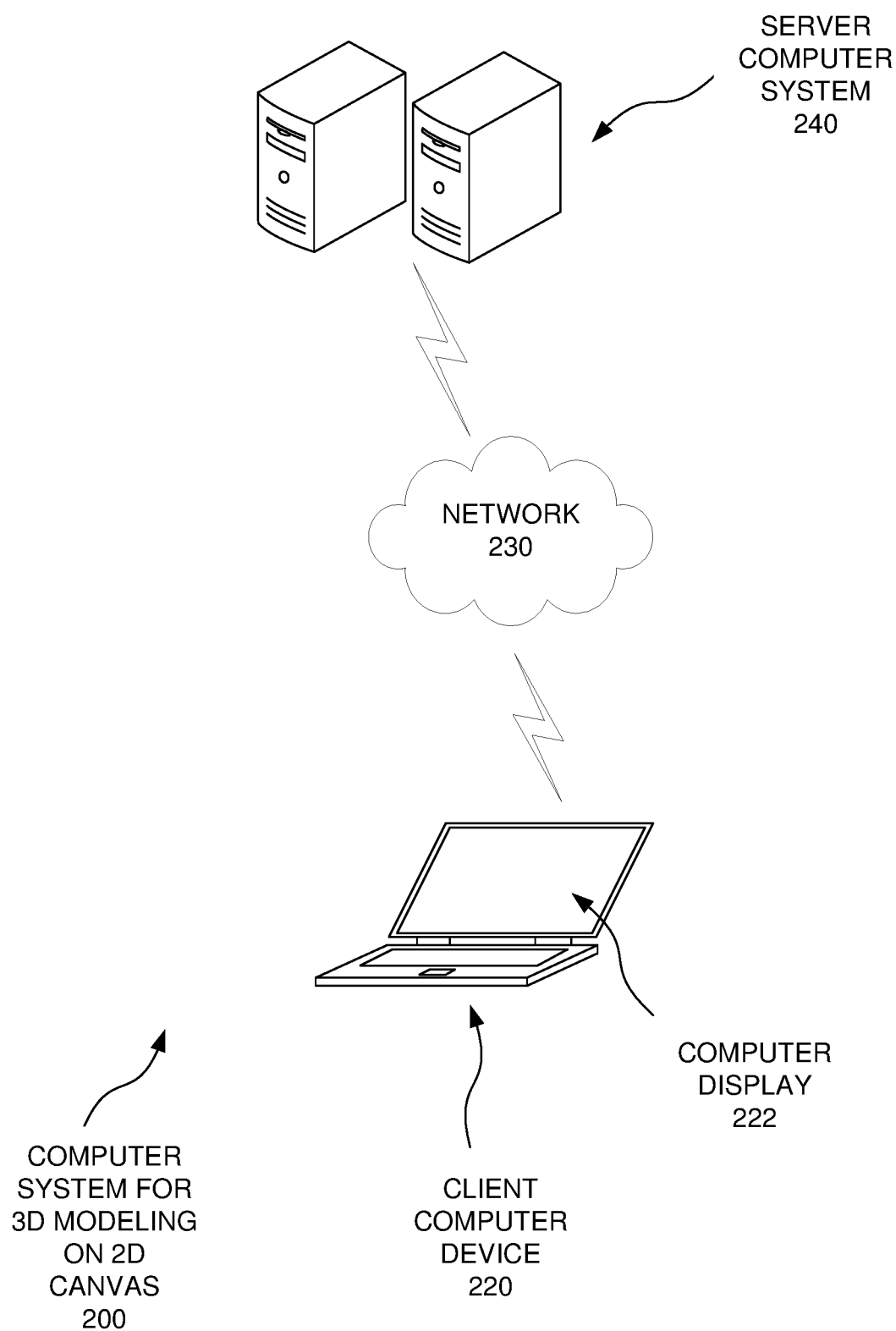
FIG. 2 is a schematic diagram of a system for three-dimensional modeling in a two-dimensional canvas.

FIG. 2 is a schematic diagram of a system (200) for three-dimensional modeling in a two-dimensional canvas, in conjunction with which one or more of the described aspects may be implemented.

In referencing FIG. 2 and elsewhere herein, communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

Figure 3:
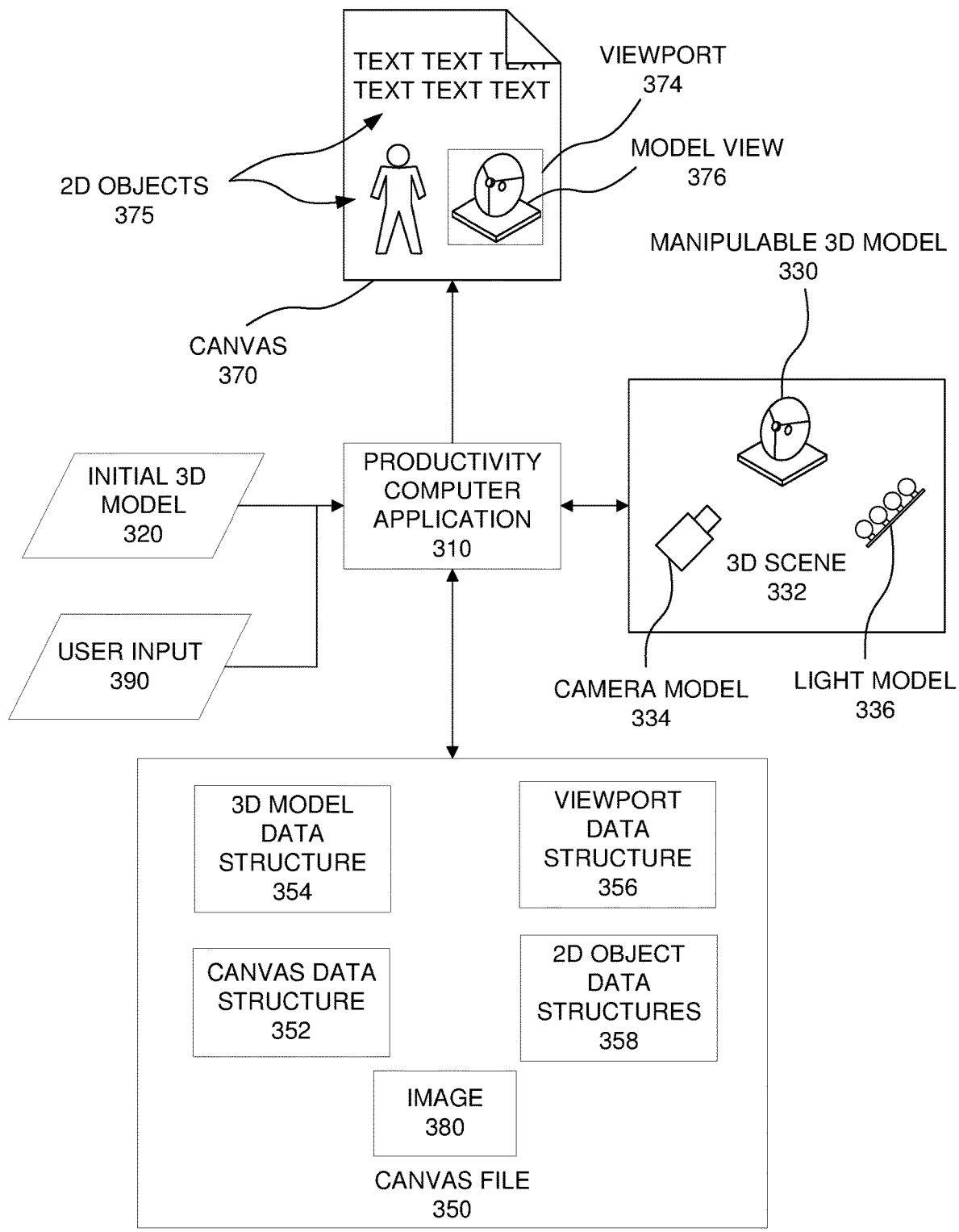
FIG. 3 is a schematic diagram of computer components related to a productivity computer application in a computer system.

Referring now to FIG. 2, components of the computer system (200) will be discussed. Each of the components includes hardware, and may also include software. For example, a component of FIG. 2 and/or FIG. 3 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed in one or more client computing devices and other operations of the component being performed in one or more machines of a server).

The computer system (200) of FIG. 2 can include a client computer device (220) that can include a computer display (222). The client computer device (220) can communicate over a computer network (230) with a server computer system (240). The tools and techniques discussed herein can be distributed in any of many different ways between one or more client computer devices (220) and/or server computer systems (240). Indeed, the tools and techniques may be implemented in a stand-alone computer device, such as a client computer device (220) that is not currently connected to a computer network (230). As another example, a computer application that is performing techniques discussed herein may be a Web application that is running in a server computer system (240) utilizing a browser application on a client computer system. As another example, such an application may be distributed between components running in a client computer device (220) and a server computer system (240).

Referring now to FIG. 2, a computer system such as the computer system (200) can run a productivity computer application (310), such as a word processing application, a spreadsheet application, a slide presentation application, and email application and/or a note-taking application. Alternatively, some other type of application that utilizes two-dimensional canvases may be used. Indeed, some tools and techniques discussed herein may be useful in a three-dimensional space that does not involve a two-dimensional canvas.

The productivity application (310) can generate or receive an initial three-dimensional model (320). For example, the initial model (320) may be generated from scratch in response to user input in the productivity computer application. As another example, the initial model (320) may be one of a number of available three-dimensional model templates generated specifically for use with the productivity computer application (310). As another example, the initial model (320) may be received by the productivity computer application in one format, and may be converted to another format by the productivity computer application (310) to allow for manipulation with the productivity computer application (310). For example, the productivity computer application (310) may be programmed to convert any of a number of different three-dimensional file formats (e.g., .OBJ, .FBX, .PLY, .3MF, .STL, or .GLB formats) into a single format that is used by the productivity computer application (310) to present and manipulate three-dimensional models (330). To perform the conversion, the productivity computer application (310) may invoke some other computer component to perform some or all of the conversion, such as utilizing an existing application programming interface. Accordingly, manipulable three-dimensional models (330) may be in the same format as when received by the productivity computer application (310), or they may be in a converted format. In one example, the productivity computer application (310) may receive an initial three-dimensional model (320) from a remote server computer system, and may or may not convert that initial three-dimensional model (320) to produce the manipulable three-dimensional model (330).

The productivity computer application (310) can include the manipulable three-dimensional model (330) in a three-dimensional scene (332), which is a model of an actual three-dimensional scene, and can include the manipulable three-dimensional model (330), a camera model (334) (sometimes referred to as a virtual camera or simply as a camera) that defines properties of a model of a camera through which the manipulable three-dimensional model is viewed in the three-dimensional scene (332), and a light model (336), which defines modeled lighting properties for the three-dimensional scene (332). For example, the three-dimensional scene (332) can include relative positions for the manipulable three-dimensional model (330), the camera model (334), and one or more light sources for the light model (336). The three-dimensional scene (332) can also include other properties, such as field of view for the camera model (334), and additional lighting properties for the light model (336). As used herein, manipulation of the three-dimensional model (330) can refer to manipulation of properties of the three-dimensional scene (332) used to display the manipulable three-dimensional model (330), such as sideways and up-down translation of the camera model (334) for panning, changing the field of view of the camera model (334) for zooming, and/or rotating the manipulable three-dimensional model (330) for rotation of the three-dimensional model (330). Other manipulations to the three-dimensional scene (332) may be used in addition to or in place of these manipulations, such as translating the manipulable three-dimensional model (330) for panning, moving the camera model (334) for zooming operations, and/or rotating the camera model (334) around the manipulable three-dimensional model (330) for rotation of the manipulable three-dimensional model (330). When referring herein to manipulating a three-dimensional model, any such types of manipulations may be contemplated, whether directly manipulating the three-dimensional model itself, or manipulating the view of the three-dimensional model by manipulating other components in the three-dimensional scene.

The productivity computer application (310) can maintain a canvas file (350), such as a word processing file, a spreadsheet file, or some other type of canvas file. As an example, the canvas file can include a canvas data structure (352) that defines a canvas (370) such as a page of a word processing document), a three-dimensional model data structure (354) that defines the three-dimensional scene (332) including the manipulable three-dimensional model (330), a viewport data structure (356) that defines a viewport (374) for viewing the manipulable three-dimensional model (330) according to properties of the three-dimensional scene (332) in the three-dimensional model data structure (354), and two-dimensional object data structures (358) that define properties of other two-dimensional objects (375) (visual objects) in the two-dimensional canvas (370).

III. General Modeling and Rendering Examples

The productivity computer application (310) may transform the manipulable three-dimensional model (330) in one of various ways, such as transforming the three-dimensional model (330) into a polygon model. Operations can be performed for translating and/or rotating the manipulable three-dimensional model (330). For example, rotation of the three-dimensional model may include the productivity computer application (310) performing three-dimensional matrix transformations and quaternion rotations.

Rendering of a view of the manipulable three-dimensional model (330) will now be discussed. The manipulable three-dimensional model (330) can be represented as many triangles in three-dimensional space. The productivity computer application (310) can transform vertices of the triangles into corresponding points in a two-dimensional plane for rendering, and can account for perspectives of the view as defined by the three-dimensional scene (332) in performing these operations (such as the camera position and field of view of the camera model (334)). For example, this may include performing matrix operations and/or quaternion operations. The productivity computer application (310) may also apply clipping operations to clip portions of the image outside the viewing area, such as outside the viewport (374). Additionally, the productivity computer application (310) may perform operations such as rendering conversion operations to fill in portions of the resulting three-dimensional model view (376). This can include calculating which pixels to render, which can include determining which pixels are blocked by other pixels in the three-dimensional model view (376). Additionally, the pixels' color, texture, and shading can be calculated using color, texture, and lighting properties from the three-dimensional scene (332). Different rendering and/or modeling techniques from those discussed herein may be used.

The productivity computer application (310) may include the resulting two-dimensional model view (376) of the three-dimensional model (330) in the viewport (374) in the canvas (370) on a computer display. Also, the productivity computer application (310) may generate a digital image (380) (which may be in an image file format, such as a .png (portable network graphics) file) using the pixel properties from the rendering of the manipulable three-dimensional model (330). The image (380) may be utilized by the productivity computer application (310), and may be stored as part of the canvas file (350) (which may include storing the image within the canvas file (350) itself or including a reference to the image (380) in the canvas file (350)).

The model manipulation and rendering operations can be performed directly by the productivity computer application (310) using hardware in the computer system. However, as with other operations discussed herein, some or all of the operations may be performed by the productivity computer application (310) invoking other local or remote computer components to perform the operations. For example, the productivity computer application (310) may make application programming interface calls or other requests to local and/or remote applications to perform operations such as manipulation operations on the manipulable three-dimensional model (330) and/or rendering operations to produce the two-dimensional model view (376) of the three-dimensional model (330).

IV. Advantageous Tools and Techniques

A. Continuous User-Controlled Model Rotation in a Two-Dimensional Canvas

The productivity computer application (310) can respond to continuous user input (390) by performing continuous real-time rotation and other manipulations of the three-dimensional model (330) through the viewport in the two-dimensional canvas (370). In other words, real-time results of such manipulations can be displayed in the viewport (374) in real time in response to the user input (390). The user input may be directed at the viewport (374) as well, such as by providing touch input or cursor input directed at the viewport (374). As examples, such manipulations may include rotating, panning, and/or zooming.

Figure 4:
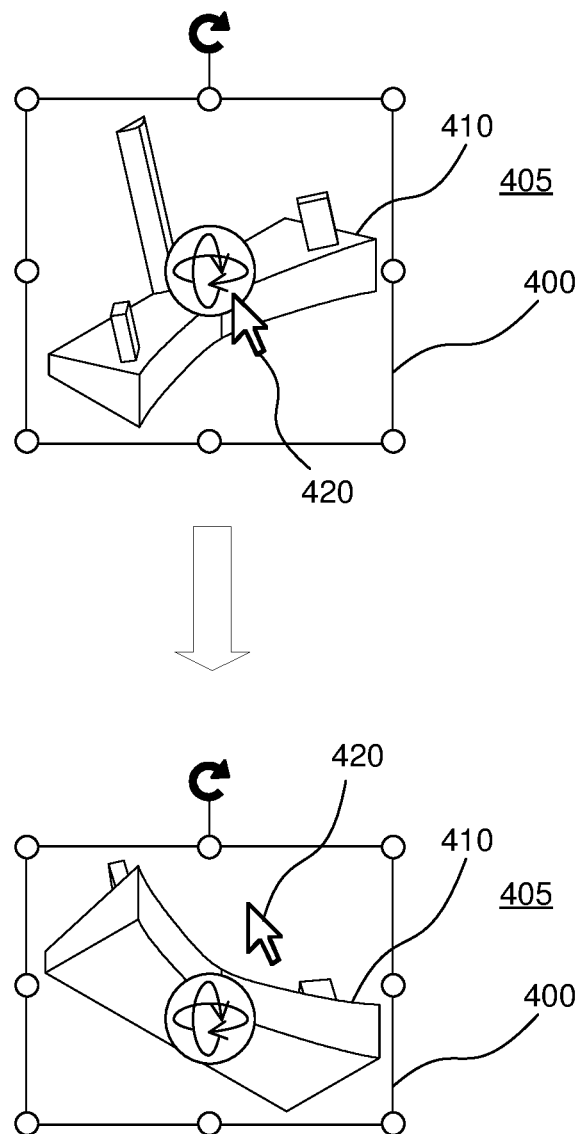
FIG. 4-6 are illustrations of a viewport displaying views of a three-dimensional model being manipulated.

Referring to FIG. 4, a displayed viewport (400) is illustrated in a two-dimensional canvas (405) (the canvas (405) may be bounded in one or more directions, but the bounds are not illustrated in this figure), including a displayed three-dimensional model view (410) of a three-dimensional model. As illustrated in the top view of FIG. 4, user input can be provided, such as by directing a cursor (420) at the three-dimensional model view (410) and dragging to freely rotate the three-dimensional model in real time in response to the dragging of the cursor, and thereby rotate the three-dimensional model view (410) in real time in response to the dragging (such as with the model being rendered and displayed at a frame rate sufficient for real time response), such as thirty frames per second, with the result of the rotation being illustrated in the bottom view of FIG. 4.

Figure 5:
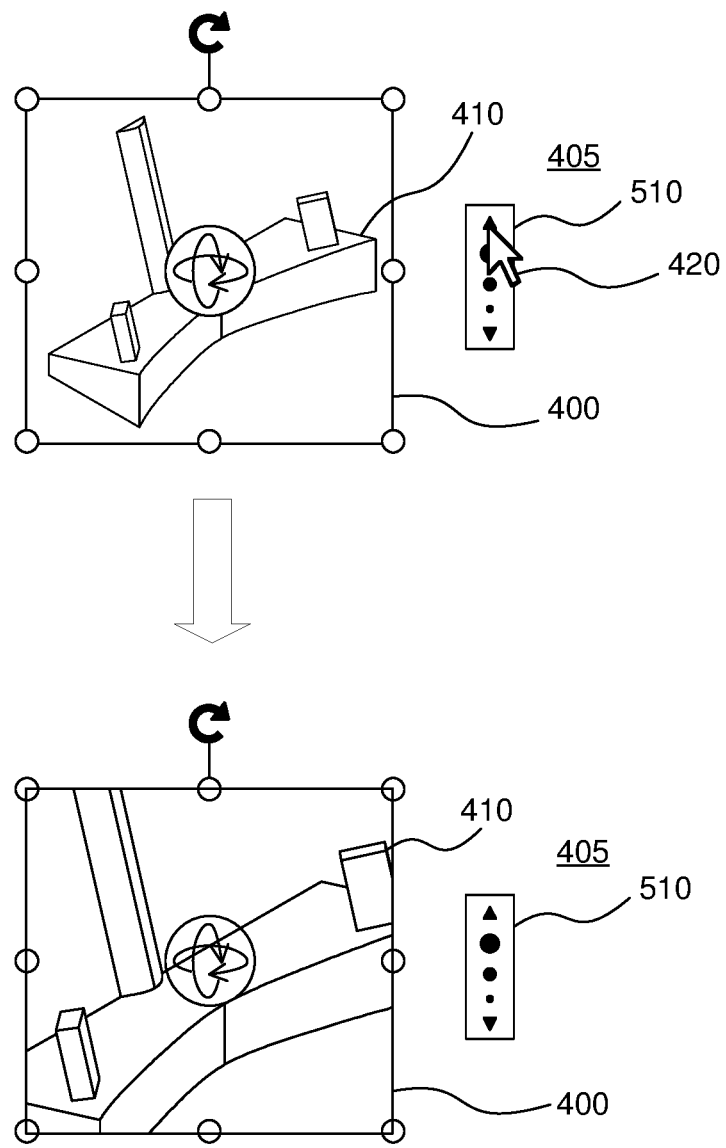

Another manipulation is illustrated in FIG. 5 with the same viewport (400) as in FIG. 4. In FIG. 5, the display includes a zoom bar (510) adjacent to the viewport (400) when the viewport (400) is selected with user input directed at the viewport (400). The zoom bar can be selected with the cursor (420) to zoom into or out of the three-dimensional model view (410). Other types of user interface controls may be used instead of those shown in the figures. For example, some other type of zoom control may be used instead of the zoom bar (510) (such as one or more magnifying glass icons that can be selected to zoom in or out). As with the rotation discussed above, this zooming can be done continuously in real time in response to the user input action. The bottom view in FIG. 5 illustrates the viewport (400) after zooming into the three-dimensional model view (410). Portions of the three-dimensional model view (410) lying outside the viewport (400) are clipped so that they are not displayed in the canvas (405).

Similar continuous manipulations can be performed for other types of manipulations. For example, continuous panning can be performed in response to user input indicating panning operations, such as dragging a cursor across the viewport (400) while a panning operation is engaged in response to user input.

B. Viewport Autofit and Non-Autofit Modes

Manipulations can be performed in different modes of operation to produce different features by the computer system. For example, manipulations may be performed with a viewport autofit mode or a viewport non-autofit mode.

The results of an autofit mode are illustrated in FIG. 4. As can be seen, as the three-dimensional model was rotated, the size of the viewport (400) changed to fit the resulting size of the three-dimensional model view (410). Specifically, in this situation the height of the viewport (400) decreased in response to the decreased height of the three-dimensional model view (410). The width and/or the height of the viewport (400) may change in response to different manipulations to the three-dimensional model represented in the three-dimensional model view (410).

The calculation of the size of the model view (410) for calculating the resulting size of the viewport (400) can include directly analyzing pixels for the model view (410) and sizing the viewport (400) relative to those pixels, or by analyzing points such as points of triangles used in rendering the model view (410). For example, the entire three-dimensional scene (332) may be drawn as a two-dimensional view in a bitmap data structure. This may include configuring the camera set up in the three-dimensional scene (332) so that the three-dimensional model (330) will not get clipped in any orientation of the three-dimensional model (330). That bitmap may be examined to identify empty space around the outside of the depiction of the three-dimensional model (330) in that scene with the current view. This can include examining differences in values of the visual properties of the pixels, to determine where pixels differ from background pixels, such as the pixels on the outer edge of the bitmap. For example, this can include analyzing an alpha channel of the pixels to identify pixels to be trimmed (e.g., if alpha is zero, that may indicate that nothing in the model is present because the pixel has the same values as background pixels). The bounds of the viewport can be trimmed to fit the determined location of the model, possibly with a predetermined boundary around the model (such as a predetermined number of pixels outside the model being included in the viewport). The viewport may be shaped to the contours of the model, or it may be some other shape such as a rectangular shape.

However, performance may be enhanced by approximating the extents of the model view (410) using bounding boxes. Bounding boxes are often generated for basic components of three-dimensional models in existing modeling and rendering techniques, and can be retrieved from existing application programming interfaces. For examples, each bounding box may be a cube, or possibly some other basic shape, which contains a sub-part of a three-dimensional model. The positions of the points of those bounding boxes, projected into two-dimensional space through a rendering process using the three-dimensional scene for the model can be used to estimate the extents of the model view (410). Using such bounding boxes will typically yield a size for the viewport (400) that is larger than the model view (410), because the bounding boxes contain the model sub-parts, but may extend beyond the sub-parts they contain. This can provide for a natural margin around the model view (410) in the viewport (400). Also, by using the bounding boxes for computing the extents of the model view (410), rather than using the points of the model itself (such as triangles representing the model in a rendering process), computational resources can be conserved because the bounding boxes typically include fewer points to be analyzed than the representation of the model itself.

Some manipulations can be performed in a non-autofit mode. In that mode, the size of the viewport (400) is not automatically updated to fit the model view (410) as manipulations are performed to the three-dimensional model in response to user input. An example of a manipulation using such a non-autofit mode is illustrated in FIG. 5, discussed above. As can be seen, the size of the viewport (400) stays the same, and portions of the model view (410) outside the viewport (400) are clipped so that they are not displayed. The size of the viewport (400) could similarly stay the same if the size of the model view (410) decreased, such as by zooming out.

The computer system can switch between the autofit mode and the non-autofit mode in response to direct user input, such as user input making a selection in a menu or dialog box displayed for a computer application. Additionally, the computer system may automatically switch between modes in some situations. For example, if user input indicates that the model is to be panned or zoomed while in autofit mode, the computer system may automatically switch to a non-autofit mode. As another example, if the computer system is in non-autofit mode and user input selects one of the view presets discussed herein, the computer system may display the corresponding preset view and switch to autofit mode.

C. Rotating the Model Around a Camera Look-At Point

As discussed above, when performing rotation manipulations of a three-dimensional model, the model can be rotated around a look-at point of the camera model in the three-dimensional scene used to render the model view in the viewport. This look-at point is the central point of the camera's view, which is a central line of sight in three-dimensional space, but it is projected into a single point when camera transformations are performed. That look-at point can be kept at the center of the viewport in the two-dimensional space of the viewport. By maintaining the look-at point at a fixed point on the viewport, such as the center of the viewport, some unintended movement (sometimes referred to as skipping or jumping) of the model view relative to the viewport when switching between the autofit mode and the non-autofit modes can be avoided.

D. Ghosting Outside the Viewport

Figure 6:
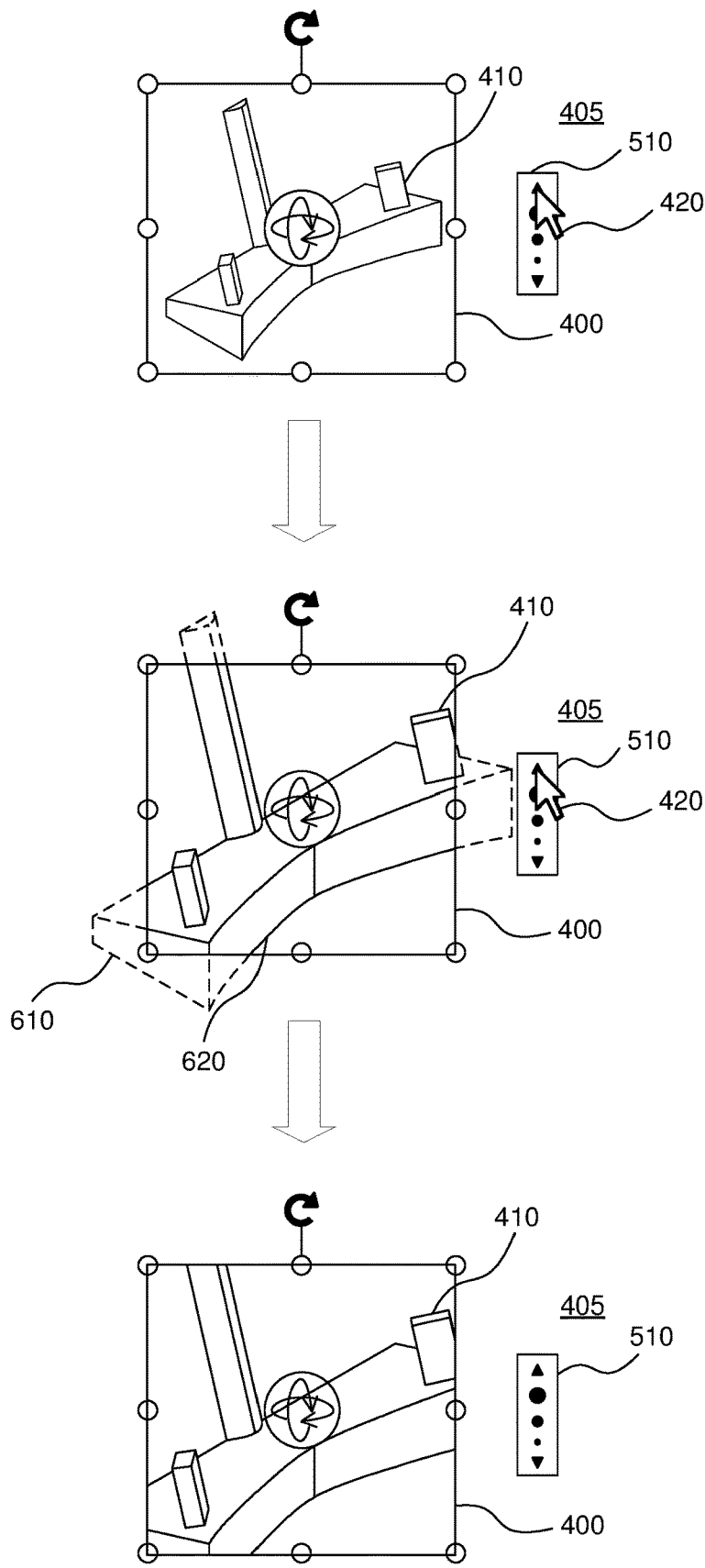

When performing a manipulation in a non-autofit mode in which at least part of the model view (410) extends outside the viewport (400), ghosting can be performed for that portion that is outside the viewport (400). FIG. 6 illustrates the same zooming operation discussed above with reference to FIG. 5, and the same reference numbers from FIG. 5 are used. However, in FIG. 6, the middle view illustrates ghosting, with two sub-parts (610) of the model view (410) that extend outside the viewport (400) being ghosted, and with sub-parts (620) of the model view that are within the viewport (400) being displayed as non-ghosted. The ghosted sub-parts (610) may be displayed with one or more visual features being removed as compared to the non-ghosted sub-parts (620). As illustrated in FIG. 6, the ghosted sub-parts (610) are illustrated with dashed lines, and the non-ghosted sub-parts (620) are illustrated with solid lines. This is done for purposes of illustration in this patent application, but it could also be done with lines in the model view (410) of an actual display. As another example, the ghosted sub-parts (610) may be displayed as semi-transparent, while the non-ghosted sub-parts (620) may be opaque (or less transparent than the ghosted sub-parts (610)).

The ghosting may be performed while the continuous user input is provided to manipulate the three-dimensional model. Once the continuous manipulation ceases, or an indicator is de-selected (such as removing a finger from a touch screen, or releasing a button on a computer mouse), the ghosting can cease. This can result in the ghosted sub-parts (610) being hidden from view, or clipped. Ghosting may be used in other scenarios, such as when setting a frame to a desired view.

The ghosting may be implemented using different techniques. In one example, for each frame during the manipulation, a single rendering of the three-dimensional model can be performed. Two different view layers of the resulting model view (410) can be rendered in the same spot in the canvas (405), each with a different texture. One of the layers can be an opaque layer for the non-ghosted sub-parts (610), and that opaque layer can be clipped to remove portions outside the viewport (400). The other layer can be a semi-transparent layer that is not clipped (except possibly if it extends beyond the canvas (405) or beyond a view window of the application). Thus, the opaque layer can display the non-ghosted sub-parts (610), and the semi-transparent layer can extend beyond the opaque layer to display the ghosted sub-parts (620) (the portions of the semi-transparent layer that are not covered by the opaque layer). As noted above, in another implementation, the ghosted layer may simply be implemented with object lines being rendered as dashed or grayed out lines, rather than solid lines (or lighter lines instead of darker lines, etc.).

E. Normalized Modeling Units and Values

Three-dimensional models can have different unit sizes. For example, one model may be a model of a thirty-meter-long boat, or an even larger model size (such as a model of the planet Earth). Another may be for a fifteen-centimeter long pencil, or an even smaller model size. On the other hand, the canvas can be bounded and may have its own units (such as an eight and a half-inch by eleven-inch size document in a word processor). When length values for a three-dimensional scene are displayed for a user, it may be unclear whether the units and scale of the values are those of the model or those of the canvas. For example, a distance of a camera from a three-dimensional model may be given with length units such as centimeters, and it may be unclear which units and scale are being used for that distance. Additionally, using model unit values or canvas unit values may result in very large or very small values that may cause issues in computations in computer systems.

To deal with these issues, values in the three-dimensional model and scene can be normalized. As an example, an overall bounding box for the overall three-dimensional model (which may be given by a three-dimensional modeling application programming interface) may be analyzed, and the largest dimension (out of the length, width, and height, or X, Y, and Z directions) of the bounding box may be set to a value of one. All other length dimensions can be scaled to that same unit system. For example, if the largest length of the bounding box is ten meters, then all the length values in meters can be divided by ten to produce the normalized values (e.g., a length value of five meters is scaled to a normalized value of 0.5). As an example, if the camera model in the three-dimensional scene were thirty meters directly out from the center of the three-dimensional model, then the camera placement is 3.0 on the protruding axis, and 0 in the other two dimensions (i.e., on the other two axes). The normalized values can be used in the three-dimensional modeling and rendering techniques. Additionally, normalized values can be displayed and may be revised in response to user input (such as to change a camera position).

F. Preset Buttons with On-Button Previews

Figure 7:
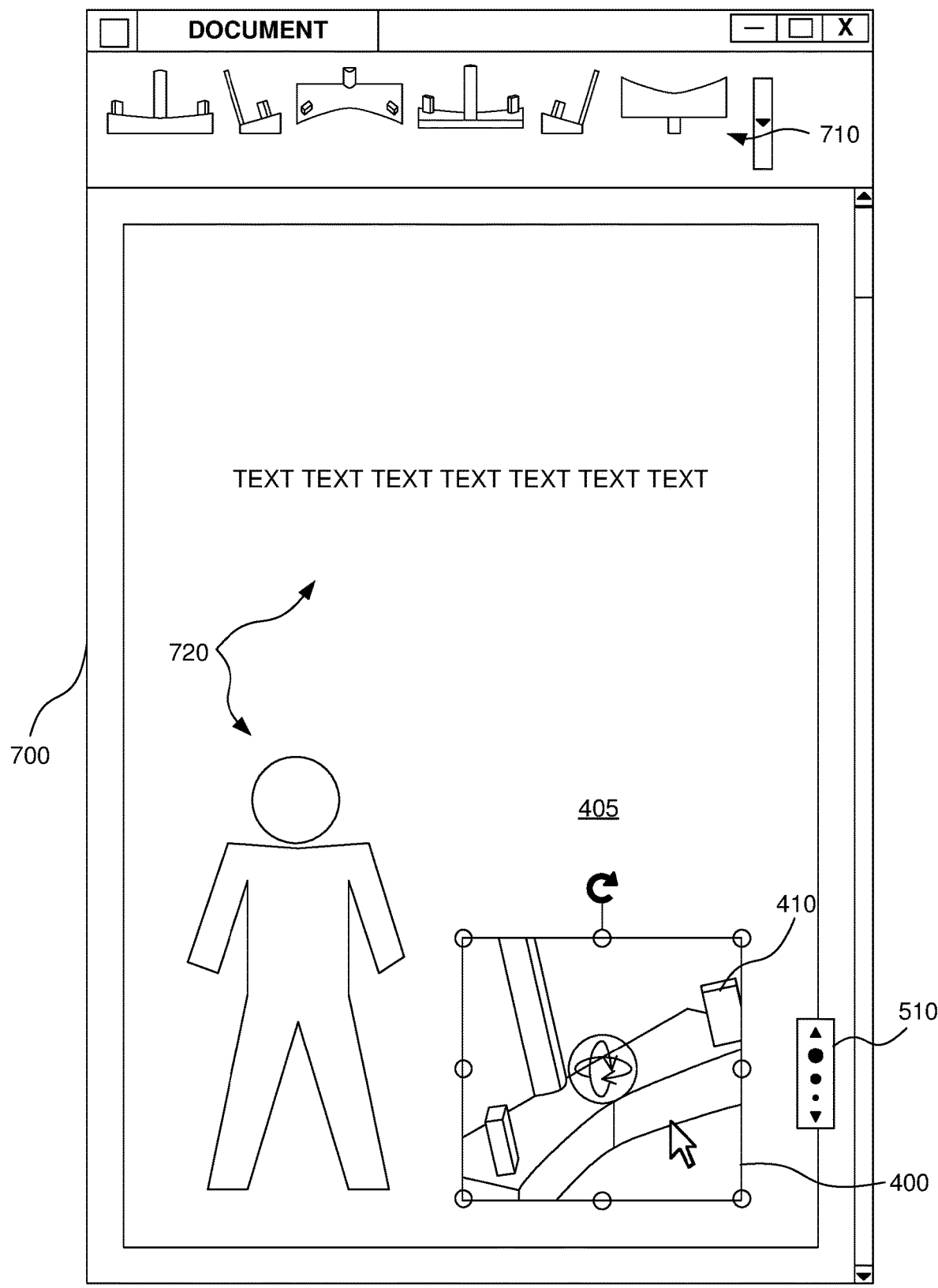
FIGS. 7-8 are illustrations of an application window that includes a canvas including a viewport displaying a model view of a three-dimensional model.

Referring now to FIG. 7, a canvas (405) is illustrated having the viewport (400) including the model view (410) from FIG. 6 illustrated in the canvas (405). The canvas (405) is presented by a computer application as part of an application window (700), which also includes six preset buttons (710). For example, the canvas (405) may be a page of a word processing document, and the application may be a word processing application. The canvas (405) can also include two-dimensional objects (720), including a two-dimensional image and text.

The preset buttons (710) can each be selected to apply a set of settings to the model view (410) for the selected viewport (400). The computer application can store these settings in preset data structures, and may also store at least one preview image for each preset button. Each preview image can be an image file (such as a bitmap file, a .png file or a thumbnail file), which can be produced by rendering the three-dimensional model with the settings corresponding to a preset button to produce pixel values, and using the pixel values to produce image files. For example, the preset buttons may include the six main orthogonal views for a three-dimensional model. The preset buttons may include buttons for other views in addition to or instead of these, which may be at any rotation along each of the three axes. For example, the preset buttons may include additional views at forty-five-degree angles in one or more axes relative to the main orthogonal views. Each button can include a display of a thumbnail preview image of the three-dimensional model in the corresponding view for the button. For the model being displayed in the viewport (400), the preset buttons in FIG. 7 illustrate the orthogonal views of the three-dimensional model. In addition to the different views, preset buttons may indicate additional settings, such as camera model settings and/or lighting settings.

Figure 8:
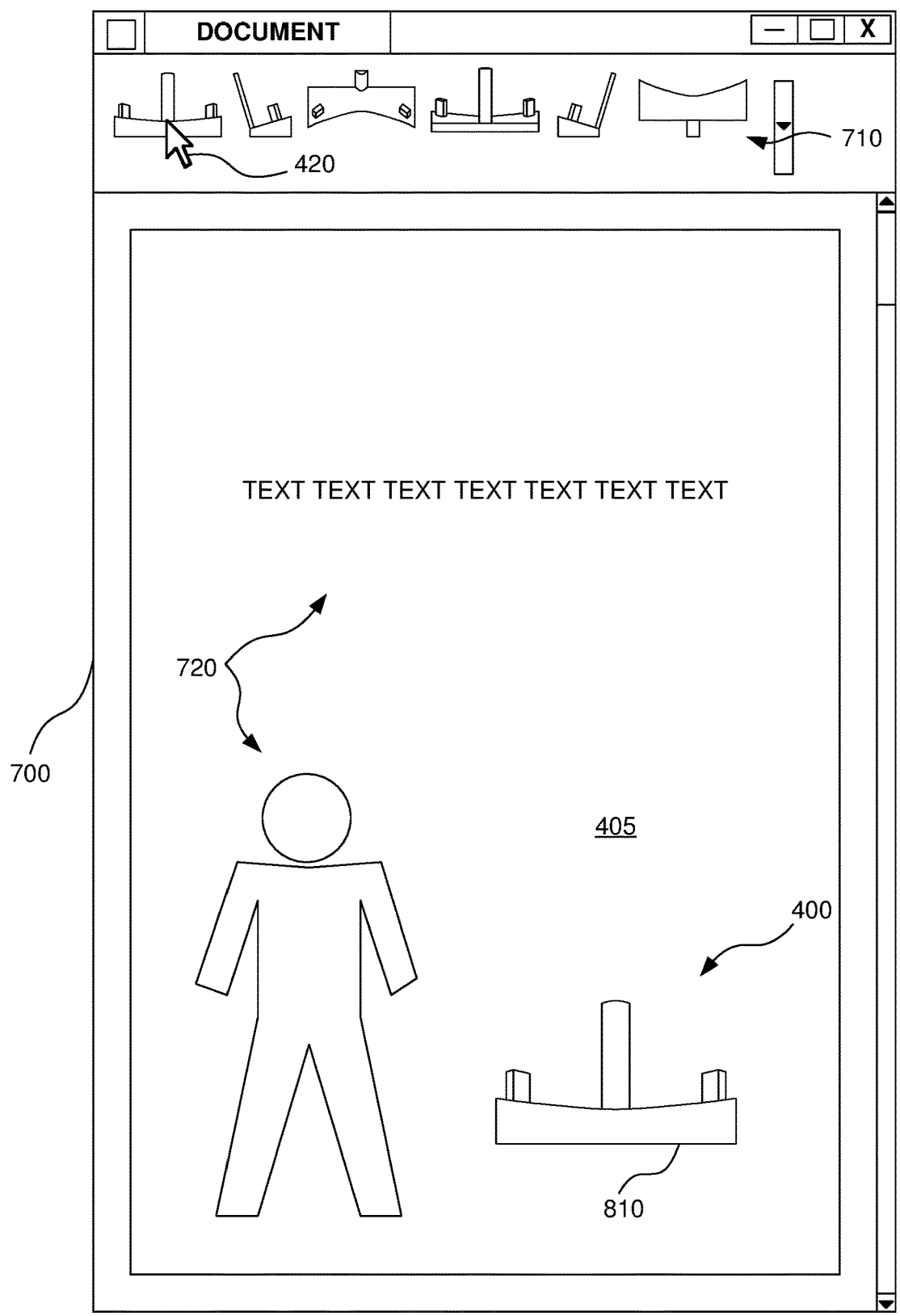

When a preset button (710) is selected by user input, such as by a mouse pointer cursor, as illustrated in FIG. 8, the corresponding preview image (810) can be displayed in the active viewport (400). The borders of the active viewport (400) are not illustrated in FIG. 8, as may often be the case for displaying the viewport when it is not selected for performing manipulations. As an example, a preview of the view for the preset button (710) may be presented when the cursor (420) is hovered over the corresponding preset button (710). This presentation may be done by presenting the stored image, which can be a pre-generated image that was generated by rendering a view of the three-dimensional model with the corresponding preset settings. In response to user input selecting the preset button, the view that was in the preview in the viewport (400) in the canvas (405) can remain. This may be done by continuing to display the pre-generated image, or by loading and rendering the actual three-dimensional model.

The display of the model view for the preset button (710) may be done by immediately responding to selection of the preset button (710) by performing operations to display the view for the selected preset button (710) (such as by immediately displaying the stored image), without interpolating between the current view and the view for the preset button (710). Alternatively, the computer system may respond to selection of the preset button (710) by rendering and displaying an animation showing the displayed image gradually interpolating from the current view to the view for the selected preset button (710). Such interpolating can be done by modifying values in the three-dimensional scene (332) that includes the displayed three-dimensional model (330) from values for the current view to values for the view for the preset button (710). Thus, during the interpolating, the values can be changed, then an updated view of the three-dimensional model (330) can be rendered and displayed with these new values, the values can then be further changed, another updated view of the three-dimensional model (330) can be rendered again. This can continue until the values are equal to the values for the selected preset button (710).

In interpolating from a current view to a preset button view, the duration of the interpolating can be set to a preset amount of time. For example, a duration of about 0.5 seconds or about 1.0 seconds for the interpolating may be used. Also, different frame rates may be used. For example, the frame rate may be about 30 frames per second or about 60 frames per second, though the actual frame rate may vary depending on actual conditions, such as delays in the computer system. The values for the three-dimensional scene (332) may be changed according to different techniques. For example, the values may be changed linearly during the duration of the interpolating. However, different animation curves may be used, where a curve represents the variation in the rate of change of the values over time. For example, such a curve may start and/or end with a small rate of change, with a larger rate of change in the remainder of the curve. In one example, the curve may begin as a small value (a small rate of change), which may increase (to a large rate of change) and then decrease again (to a small rate of change), such as generally following a bell-shaped curve. Many different types of curves may be used for such animations, such as forms of sine wave curves, quadratic curves, variations using such curves, or other curves.

G. User-Defined View Presets

Some presets corresponding to the preset buttons may be defined in response to user input. For example, when a current model view (410) is being displayed, user input can be provided, indicating that a preset is to be saved for the current model view (410). In response, the computer application can save the current three-dimensional model settings in a preset data structure in sufficient detail to reproduce the current model view (410). For example, such settings may include model position settings, camera model settings, and/or lighting settings. In addition to the settings, the application may also generate and store preview images of the model view corresponding to the preset, such as a thumbnail image and a preview image to be displayed in a preview in the canvas. Such images can be generated in the same manner as discussed above for the other preset button images and preview images. The thumbnail image can be displayed on a preset button (710) that can be selected to apply the settings. Similarly, the stored preview image can be used as discussed above for displaying a preview when requested by user input, such as by hovering a pointer over the preset button in a user interface display.

H. Two-Dimensional Image Substitution

Preview images, such as those discussed above in the discussion of view presets, may be used for image substitution. In image substitution, when a canvas (405) is displayed, the pre-generated two-dimensional image of the model view (410) can be rendered and displayed. This can be done without loading and rendering the three-dimensional model, which typically uses more computing resources than rendering a corresponding two-dimensional image. When user input is provided to select the image, indicating that the three-dimensional model is to be manipulated, the computer system can then respond by loading the three-dimensional model and rendering the model view (410) from the three-dimensional model. When a file for the canvas (405) is saved, the current model view (410) can be saved to computer storage as a digital image (which can be generated in the same manner as the preview images discussed above), which can be stored in the file for the canvas (405), such as a word processing document file, a spreadsheet file, a presentation slide file, or an email file. When the file for the canvas (405) is later loaded, that digital image can be loaded and displayed in place of the rendered three-dimensional model view (410), until user input indicates that the underlying three-dimensional model is to be manipulated.

V. Example Dialog

Figure 9:
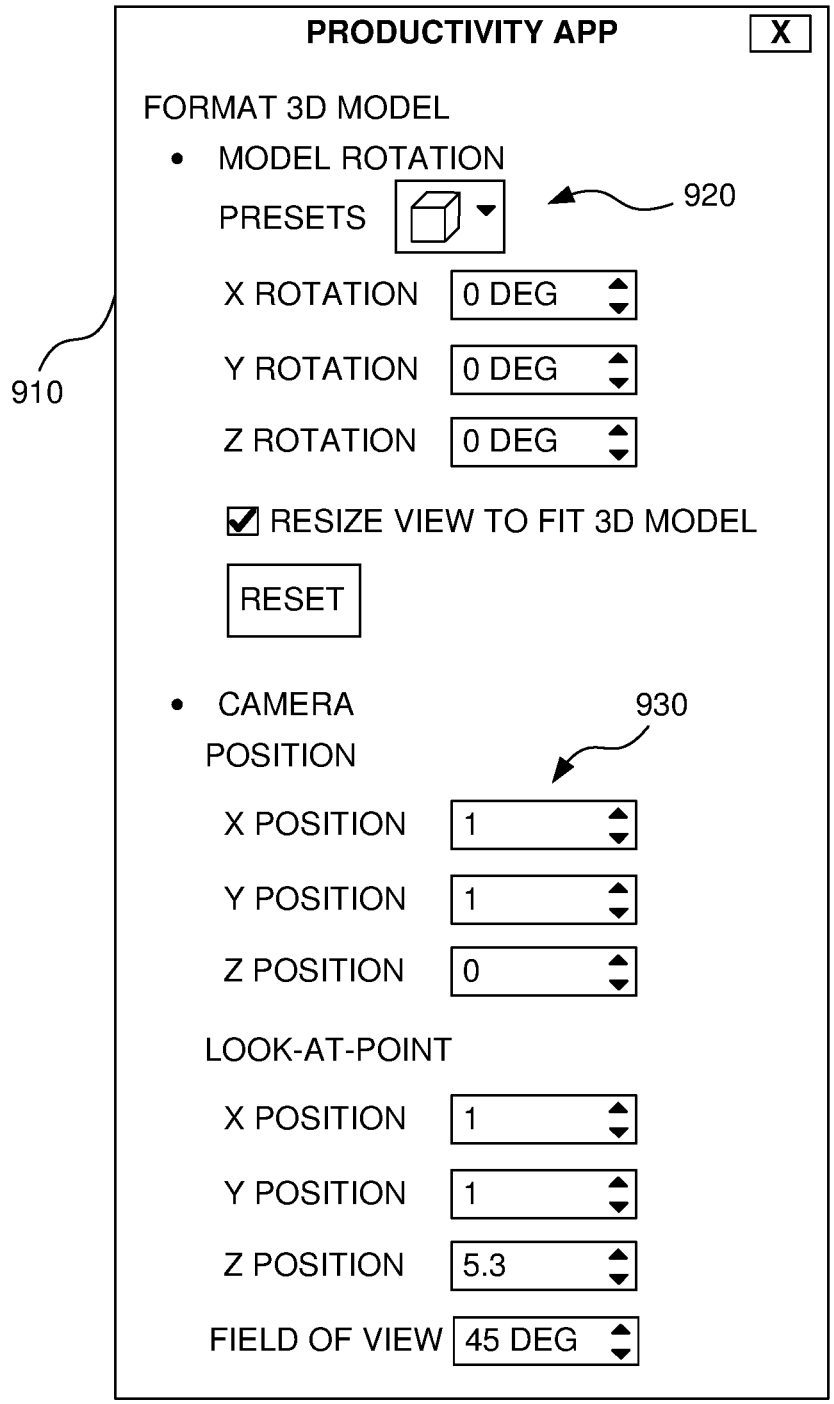
FIG. 9 illustrates an example dialog that displays formatting settings for three-dimensional models in a two-dimensional canvas.

FIG. 9 illustrates an example dialog (910) that displays formatting settings for three-dimensional models in a two-dimensional canvas. The settings displayed in the dialog (910) can be revised by the computer system in response to user input. The dialog (910) includes a drop-down menu (920) that can be selected to reveal preset options (with preset option buttons) that can be selected for the active three-dimensional model view, as discussed above. For example, selection of the drop-down menu (920) can reveal the gallery of preset buttons discussed above. The dialog (910) also includes X Rotation, Y Rotation, and Z Rotation, which can be revised in response to user input, to alter the rotation of the three-dimensional model. A checkbox (next to Resize View to Fit 3D Model) can be checked to engage autofit mode for autofit of the viewport to the size of the three-dimensional model view in the viewport, or unchecked to engage non-autofit mode, as discussed above. Camera settings can include normalized unit displays (930), which can display and allow revisions of normalized unit values for X, Y, and Z coordinates of camera position and camera look-at-point position.

VI. Techniques for Three-Dimensional Digital Models in a Two-Dimensional Canvas

Several techniques for three-dimensional digital models in a two-dimensional canvas will now be discussed. Each of these techniques can be performed in a computing environment as a computer-implemented method. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic. The different tools and techniques discussed below can be used in any combination with each other. Also, each of the advantageous tools and techniques discussed above in the Advantageous Tools and Techniques section can be used with each other in any combination thereof. Additionally, some techniques may omit some of the basic acts and/or features of the basic technique illustrated in FIG. 10 and/or other acts of different techniques discussed herein.

Figure 10:
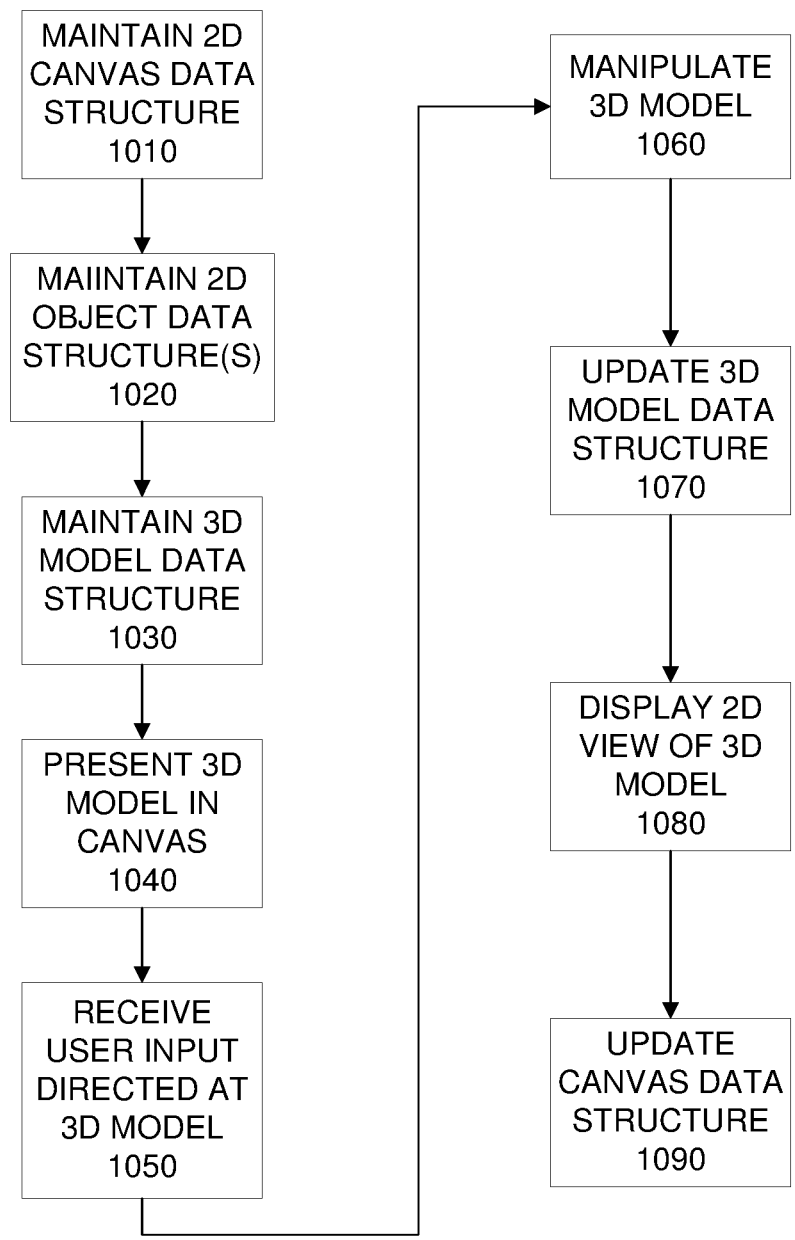
FIG. 10 is a flowchart of a technique for three-dimensional digital models in a two-dimensional canvas.

Referring to FIG. 10, a basic technique for three-dimensional digital models in a two-dimensional canvas will be described. The technique can include maintaining (1010) a two-dimensional digital canvas data structure, with the canvas data structure representing a two-dimensional digital canvas. The technique can also include maintaining (1020) one or more data structures representing one or more two-dimensional objects in the two-dimensional canvas. The technique can further include maintaining (1030) a three-dimensional model data structure representing a three-dimensional model located in the two-dimensional canvas. The technique can also include presenting (1040) the three-dimensional model in the two-dimensional canvas on a computer display. Additionally, user input directed at the three-dimensional model in the two-dimensional canvas can be received (1050). Referring still to FIG. 10, the technique may also include manipulating (1060) the three-dimensional model in response to the user input. The technique can include updating (1070) the three-dimensional model data structure to represent the manipulating in response to the user input, as well as displaying (1080) a two-dimensional view of the three-dimensional model. The technique can further include updating (1090) the canvas data structure to represent the manipulating in response to the user input. Additional techniques that can include at least part of this basic technique are discussed below.

In one technique, the user input can include a continuous movement indicating a rotation of the three-dimensional model. The manipulating (1060) can include continuously rotating the model in a three-dimensional scene in real time in response to the user input. The displaying (1080) can be performed in real time during the manipulating (1060). This displaying can include updating the two-dimensional view in real time in the two-dimensional canvas on the computer display to represent the rotating of the model.

The three-dimensional scene can include a camera model through which a view for the canvas is modeled, and the manipulating (1060) can include rotating the model without moving the camera model in the three-dimensional scene. The canvas can be a bounded canvas (having set dimensions for the canvas in at least one direction).

The displaying (1080) of the two-dimensional view of the three-dimensional model can include displaying a view of the three-dimensional model in a viewport in the two-dimensional canvas after the manipulating (1060), with the viewport being smaller than the two-dimensional canvas. The displaying (1080) can include hiding portions of the three-dimensional model in the displayed view that are located outside the viewport. The technique may further include a computer system responding to the manipulating by resizing the viewport to fit the view of the three-dimensional model after the manipulating (1060).

The technique can further include performing a two-dimensional manipulation of a two-dimensional view of the three-dimensional model in the two-dimensional canvas relative to one or more other two-dimensional objects in the two-dimensional canvas. The two-dimensional manipulation can be selected from a group consisting of text wrapping around the two-dimensional view of the three-dimensional model, moving the two-dimensional view of the three-dimensional model behind one of the other two-dimensional objects (so the other object(s) would hide the three-dimensional model view if the other object(s) overlap with the three-dimensional model view), binging the two-dimensional view of the three-dimensional model in front of one of the other two-dimensional objects, aligning the two-dimensional view of the three-dimensional model with one of the other two-dimensional objects, and combinations thereof.

Referring still to FIG. 10, another technique will be discussed. The technique can include the basic acts illustrated in FIG. 10 and discussed above. The acts can further include generating a digital image of the two-dimensional view of the three-dimensional model, which represents a view of the three-dimensional model in the two-dimensional canvas, and storing the image (such as in a digital image file format). The technique can also include loading the canvas, with the loading of the canvas comprising loading the image into the memory and displaying the image on a computer display in response to a user input request to load the canvas. The technique can additionally include receiving user input directed at the displayed image in the canvas after the loading of the canvas, and in response to the user input directed at the displayed image, loading the data structure of the three-dimensional model into the memory. Such acts can be performed prior to the presenting (1040) of the three-dimensional model in the canvas, and such presenting (1040) can be performed using the loaded data structure of the three-dimensional model.

In this technique, the image can be termed a first image, and the technique can further include: generating a second digital image of the two-dimensional view of the three-dimensional model after the manipulating of the three-dimensional model; and storing the second digital image. The technique may further include reloading the canvas, with the reloading of the canvas including loading the second image into the memory and displaying the second image on a computer display in response to a second user input request to load the canvas. Additionally, the acts can include receiving user input directed at the displayed second image in the canvas after the reloading of the canvas; in response to the user input directed at the displayed second image, loading the data structure of the three-dimensional model into the memory; and in response to the user input directed at the displayed second image and using the loaded data structure of the three-dimensional model, presenting the three-dimensional model in the two-dimensional canvas on a computer display.

In another technique, the basic acts of FIG. 10 may be performed. The displaying (1080) can include generating and displaying a non-ghosted view of a three-dimensional model portion whose view is located within a viewport in the canvas, and generating and displaying a ghosted view of a three-dimensional model portion whose view is located outside the viewport in the canvas, with a texture of the ghosted view being different from a texture of the non-ghosted view. The displaying of the two-dimensional view can include moving (such as continuously moving) the two-dimensional view of the three-dimensional model and updating (such as continuously updating) three-dimensional model ghosting so that portions of the three-dimensional model within the viewport remain part of the non-ghosted view and portions of the three-dimensional model outside the viewport remain part of the ghosted view during the updating. The updating of the three-dimensional model ghosting can include transitioning portions of the two-dimensional view of the three-dimensional model between being part of the ghosted view and being part of the non-ghosted view, as the transitioned portions move across an outer boundary of the viewport. The texture of the ghosted view can remove (i.e., omit) one or more visual features of the non-ghosted view, where such visual feature(s) are present in the non-ghosted view. For example, the one or more visual features can include opacity, and the generating of the ghosted view can include generating semi-transparent objects in place of opaque objects that would be present in the non-ghosted view. As another example, the one or more visual features can include line portions, with the generating of the ghosted view including generating dashed lines in place of solid lines that would be present in the non-ghosted view. This technique may further include displaying a two-dimensional view of the three-dimensional model in the two-dimensional canvas after the manipulating of the three-dimensional model, with the displaying after the manipulating omitting from the display the portion of the three-dimensional model whose view is located outside the viewport in the canvas.

In another technique, the basic acts of FIG. 10 may be performed. The maintaining (1030) of the three-dimensional model data structure can include converting physical length values for the three-dimensional model from physical length units in the three-dimensional model to normalized values in normalized units. The presenting (1040) of the three-dimensional model in the two-dimensional canvas can be performed using the normalized values. The technique can further include presenting a normalized value on the computer display, with the presented normalized value being one of the normalized values. The technique can further include receiving user input directed at the three-dimensional model in the two-dimensional canvas, with the user input indicating a change to the presented normalized value. The manipulating (1060) of the three-dimensional model can include changing the normalized value in response to the user input, and revising the three-dimensional model according to the changed normalized value in response to the user input.

In another technique, the basic acts of FIG. 10 may be performed. The technique can further include presenting a gallery of preset buttons on the computer display, with each of the preset buttons indicating a set of display settings for the three-dimensional model, and with the presented preset buttons each including a preview of the three-dimensional model displayed with the display settings for the preset button. The receiving (1050) of user input can include a selection of a preset button in the gallery of preset buttons. Also, the manipulating (1060) can include applying a corresponding set of selected display settings for the selected preset button. The technique may further include receiving user input hovering a user input indicator over one of the preset buttons; and in response to receiving the hovering user input, displaying in the two-dimensional canvas a preview of the three-dimensional model displayed with the display settings for the preset button over which the hovering user input occurred.

In another technique, the basic acts of FIG. 10 may be performed. The technique can further include receiving user input indicating display settings for a first view of the three-dimensional model is to be saved as a view preset for the three-dimensional model; and in response to the user input, saving the view preset in the computer system. The technique can further include presenting in the two-dimensional canvas a second view of the three-dimensional model that is different from the first view. A gallery of preset buttons can be presented on the computer display, with each of the preset buttons indicating a set of display settings for the three-dimensional model. In the receiving (1050) of the user input directed at the three-dimensional model in the two-dimensional canvas, the user input can include a selection of the first preset button. The manipulating (1060) can include applying the display settings for a first view of the three-dimensional model.

The technique may further include generating a preview of the three-dimensional model being displayed with the display settings for the first view of the three-dimensional model. The technique may further include displaying on the first preset button the preview of the three-dimensional model being displayed with the display settings for the first view of the three-dimensional model. The technique may further include receiving user input hovering a user input indicator over the first preset button; and in response to receiving the hovering user input, displaying in the two-dimensional canvas a preview of the three-dimensional model displayed with the display settings for the first view of the three-dimensional model.

In another technique, the basic acts of FIG. 10 may be performed. The technique can further include maintaining a viewport data structure representing a viewport through which the three-dimensional model is viewed in the two-dimensional canvas. The following can be performed while in a viewport autofit mode: presenting the three-dimensional model in the viewport in the two-dimensional canvas on a computer display; receiving first user input directed at the three-dimensional model in the two-dimensional canvas; performing a first manipulation of the three-dimensional model in response to the first user input; automatically resizing the viewport to fit the three-dimensional model in response to the first manipulation; updating the three-dimensional model data structure to represent the first manipulation in response to the first user input; displaying a two-dimensional view of the three-dimensional model in the two-dimensional canvas after the first manipulation; and updating the canvas data structure to represent the first manipulation in response to the first user input. The technique can further include switching from the viewport autofit mode to a viewport non-autofit mode, and receiving second user input directed at the three-dimensional model in the two-dimensional canvas. The technique can also include performing the following while in the viewport non-autofit mode: performing a second manipulation of the three-dimensional model in response to the second user input, with the second manipulation comprising changing an overall size of a view of the three-dimensional model in the viewport in response to the second manipulation, without automatically resizing the viewport to fit the three-dimensional model in response to the second user input; updating the three-dimensional model data structure to represent the second manipulation in response to the second user input; displaying a two-dimensional view of the three-dimensional model in the two-dimensional canvas after the second manipulation of the three-dimensional model; and updating the canvas data structure to represent the second manipulation in response to the second user input. The technique may further include locating a look-at point of a camera in a three-dimensional scene that includes the three-dimensional model at a center of the viewport prior to switching from the viewport autofit mode to the viewport non-autofit mode. Also, the technique can include maintaining the look-at point at the center of the viewport after the switching from the viewport autofit mode to the viewport non-autofit mode.

In another technique, the basic acts of FIG. 10 may be performed. The updating (1070) of the three-dimensional model data structure can include rotating the three-dimensional model around a point that is co-located with a look-at point of a modeled camera in a three-dimensional scene for the three-dimensional model. The displaying (1080) can include using the three-dimensional scene after the manipulating of the three-dimensional model. The displaying (1080) can include maintaining the look-at point of the camera at the center of a viewport through which the three-dimensional model is displayed in the two-dimensional canvas.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method comprising:
maintaining a two-dimensional digital canvas data structure in a computer system, with the canvas data structure representing a two-dimensional digital canvas;
maintaining one or more data structures representing one or more two-dimensional objects in the two-dimensional canvas;
maintaining a three-dimensional model data structure representing a three-dimensional model located in the two-dimensional canvas, with the maintaining of the three-dimensional model data structure comprising converting physical length values for the three-dimensional model from physical length units in the three-dimensional model to normalized values in normalized units;
presenting the three-dimensional model in the two-dimensional canvas on a computer display, with the presenting of the three-dimensional model using the normalized values;
receiving first user input directed at the three-dimensional model in the two-dimensional canvas;
a first act of manipulating the three-dimensional model in response to the first user input;
updating the three-dimensional model data structure to represent the first act of manipulating in response to the first user input;
updating the canvas data structure to represent the first act of manipulating in response to the first user input;
presenting a normalized value on the computer display, with the presented normalized value being one of the normalized values;
receiving second user input directed at the three-dimensional model, with the second user input indicating a change to the presented normalized value;
a second act of manipulating the three-dimensional model in response to the second user input, with the second act of manipulating comprising changing the normalized value in response to the second user input;
revising the three-dimensional model according to the changed normalized value in response to the second user input;
updating the three-dimensional model data structure to represent the second act of manipulating in response to the second user input;
displaying a two-dimensional view of the three-dimensional model in the two-dimensional canvas after the second act of manipulating of the three-dimensional model in response to the second user input; and
updating the canvas data structure to represent the second act of manipulating in response to the second user input.

2. The computer-implemented method of claim 1, wherein the method further comprises displaying a two-dimensional view of the three-dimensional model in the two-dimensional canvas during the manipulating of the three-dimensional model, with the displaying of the two-dimensional view comprising generating and displaying a non-ghosted view of a three-dimensional model portion whose view is located within a viewport in the canvas, and generating and displaying a ghosted view of a three-dimensional model portion whose view is located outside the viewport in the canvas, with a texture of the ghosted view being different from a texture of the non-ghosted view, with the displaying of the two-dimensional view comprising updating three-dimensional model ghosting, and with the updating of the three-dimensional model ghosting comprising transitioning portions of the two-dimensional view of the three-dimensional model between being part of the ghosted view and being part of the non-ghosted view as the transitioned portions move across a boundary of the viewport.

3. The computer-implemented method of claim 2, wherein the texture of the ghosted view omits one or more visual features of the non-ghosted view.

4. The computer-implemented method of claim 3, wherein the one or more visual features comprise opacity, with the generating of the ghosted view comprising generating semi-transparent objects in place of opaque objects.

5. The computer-implemented method of claim 3, wherein the one or more visual features comprise line portions, with the generating of the ghosted view comprising generating dashed lines in place of solid lines.

6. The computer-implemented method of claim 2, further comprising displaying a two-dimensional view of the three-dimensional model in the two-dimensional canvas after the first act of manipulating of the three-dimensional model, with the displaying after the first act of manipulating omitting from the display the portion of the three-dimensional model whose view is located outside the viewport in the canvas.

7. The computer-implemented method of claim 1, wherein:
the method further comprises presenting a gallery of preset buttons on the computer display, with each of the preset buttons indicating a set of display settings for the three-dimensional model, and with the presented preset buttons each including a preview of the three-dimensional model displayed with the display settings for the corresponding preset button;
wherein the method further comprises receiving third user input directed at the three-dimensional model in the two-dimensional canvas, with the third user input comprising a selection of a preset button in the gallery of preset buttons;
wherein the method further comprises a third act of manipulating the three-dimensional model in response to the third user input, with the third act of manipulating comprising applying a corresponding set of selected display settings for the preset button selected by the third user input;
the acts further comprise updating the three-dimensional model data structure to represent the third act of manipulating in response to the third user input;
the method further comprises displaying a two-dimensional view of the three-dimensional model in the two-dimensional canvas after the third act of manipulating of the three-dimensional model in response to the third user input; and
the method further comprises updating the canvas data structure to represent the third act of manipulating in response to the third user input.

8. The computer-implemented method of claim 7, wherein the method further comprises:
receiving user input hovering a user input indicator over one of the preset buttons; and
in response to receiving the hovering user input, displaying in the two-dimensional canvas a preview of the three-dimensional model displayed with the display settings for the preset button over which the hovering user input occurred.

9. A computer system comprising:
at least one processor; and
memory comprising instructions stored thereon that when executed by at least one processor cause at least one processor to perform acts comprising:
maintaining a two-dimensional digital canvas data structure in a computer system, with the canvas data structure representing a two-dimensional digital canvas;
maintaining one or more data structures representing one or more two-dimensional objects in the two-dimensional canvas;
maintaining a three-dimensional model data structure representing a three-dimensional model located in the two-dimensional canvas, with the maintaining of the three-dimensional model data structure comprising converting physical length values for the three-dimensional model from physical length units in the three-dimensional model to normalized values in normalized units;
presenting the three-dimensional model in the two-dimensional canvas on a computer display, with the presenting of the three-dimensional model using the normalized values;
receiving first user input directed at the three-dimensional model in the two-dimensional canvas;
a first act of manipulating the three-dimensional model in response to the first user input;
updating the three-dimensional model data structure to represent the first act of manipulating in response to the first user input;
updating the canvas data structure to represent the first act of manipulating in response to the first user input;
presenting a normalized value on the computer display, with the presented normalized value being one of the normalized values;
receiving second user input directed at the three-dimensional model, with the second user input indicating a change to the presented normalized value;
a second act of manipulating the three-dimensional model in response to the second user input, with the second act of manipulating comprising changing the normalized value in response to the second user input;

revising the three-dimensional model according to the changed normalized value in response to the second user input;

updating the three-dimensional model data structure to represent the second act of manipulating in response to the second user input;

displaying a two-dimensional view of the three-dimensional model in the two-dimensional canvas after the second act of manipulating of the three-dimensional model in response to the second user input; and updating the canvas data structure to represent the second act of manipulating in response to the second user input.

10. The computer system of claim 9, wherein the acts further comprise displaying a two-dimensional view of the three-dimensional model in the two-dimensional canvas during the manipulating of the three-dimensional model, with the displaying of the two-dimensional view comprising generating and displaying a non-ghosted view of a three-dimensional model portion whose view is located within a viewport in the canvas, and generating and displaying a ghosted view of a three-dimensional model portion whose view is located outside the viewport in the canvas, with a texture of the ghosted view being different from a texture of the non-ghosted view, with the displaying of the two-dimensional view comprising updating three-dimensional model ghosting, and with the updating of the three-dimensional model ghosting comprising transitioning portions of the two-dimensional view of the three-dimensional model between being part of the ghosted view and being part of the non-ghosted view as the transitioned portions move across a boundary of the viewport.

11. The computer system of claim 10, wherein the texture of the ghosted view omits one or more visual features of the non-ghosted view.

12. The computer system of claim 11, wherein the one or more visual features comprise opacity, with the generating of the ghosted view comprising generating semi-transparent objects in place of opaque objects.

13. The computer system of claim 11, wherein the one or more visual features comprise line portions, with the generating of the ghosted view comprising generating dashed lines in place of solid lines.

14. The computer system of claim 10, wherein the acts further comprise displaying a two-dimensional view of the three-dimensional model in the two-dimensional canvas after the first act of manipulating of the three-dimensional model, with the displaying after the first act of manipulating omitting from the display the portion of the three-dimensional model whose view is located outside the viewport in the canvas.

15. The computer system of claim 9, wherein:
the acts further comprise presenting a gallery of preset buttons on the computer display, with each of the preset buttons indicating a set of display settings for the three-dimensional model, and with the presented preset buttons each including a preview of the three-dimensional model displayed with the display settings for the corresponding preset button;

wherein the acts further comprise receiving third user input directed at the three-dimensional model in the two-dimensional canvas, with the third user input comprising a selection of a preset button in the gallery of preset buttons;

wherein the acts further comprise a third act of manipulating the three-dimensional model in response to the third user input, with the third act of manipulating comprising applying a corresponding set of selected display settings for the preset button selected by the third user input;

the acts further comprise updating the three-dimensional model data structure to represent the third act of manipulating in response to the third user input;

the acts further comprise displaying a two-dimensional view of the three-dimensional model in the two-dimensional canvas after the third act of manipulating of the three-dimensional model in response to the third user input; and the acts further comprise updating the canvas data structure to represent the third act of manipulating in response to the third user input.

16. The computer system of claim 15, wherein the acts further comprise:
receiving user input hovering a user input indicator over one of the preset buttons; and
in response to receiving the hovering user input, displaying in the two-dimensional canvas a preview of the three-dimensional model displayed with the display settings for the preset button over which the hovering user input occurred.

17. One or more computer-readable storage media having computer-executable instructions embodied thereon that, when executed by at least one processor, cause at least one processor to perform acts comprising:

maintaining a two-dimensional digital canvas data structure in a computer system, with the canvas data structure representing a two-dimensional digital canvas;

maintaining one or more data structures representing one or more two-dimensional objects in the two-dimensional canvas;

maintaining a three-dimensional model data structure representing a three-dimensional model located in the two-dimensional canvas, with the maintaining of the three-dimensional model data structure comprising converting physical length values for the three-dimensional model from physical length units in the three-dimensional model to normalized values in normalized units;

presenting the three-dimensional model in the two-dimensional canvas on a computer display, with the presenting of the three-dimensional model using the normalized values;

receiving first user input directed at the three-dimensional model in the two-dimensional canvas;

a first act of manipulating the three-dimensional model in response to the first user input;

updating the three-dimensional model data structure to represent the first act of manipulating in response to the first user input;

updating the canvas data structure to represent the first act of manipulating in response to the first user input;

presenting a normalized value on the computer display, with the presented normalized value being one of the normalized values;

receiving second user input directed at the three-dimensional model, with the second user input indicating a change to the presented normalized value;

a second act of manipulating the three-dimensional model in response to the second user input, with the second act of manipulating comprising changing the normalized value in response to the second user input;

revising the three-dimensional model according to the changed normalized value in response to the second user input;

updating the three-dimensional model data structure to represent the second act of manipulating in response to the second user input;

displaying a two-dimensional view of the three-dimensional model in the two-dimensional canvas after the second act of manipulating of the three-dimensional model in response to the second user input; and updating the canvas data structure to represent the second act of manipulating in response to the second user input.

18. The one or more computer-readable storage media claim 17, wherein the acts further comprise displaying a two-dimensional view of the three-dimensional model in the two-dimensional canvas during the manipulating of the three-dimensional model, with the displaying of the two-dimensional view comprising generating and displaying a non-ghosted view of a three-dimensional model portion whose view is located within a viewport in the canvas, and generating and displaying a ghosted view of a three-dimensional model portion whose view is located outside the viewport in the canvas, with a texture of the ghosted view being different from a texture of the non-ghosted view, with the displaying of the two-dimensional view comprising updating three-dimensional model ghosting, and with the updating of the three-dimensional model ghosting comprising transitioning portions of the two-dimensional view of the three-dimensional model between being part of the ghosted view and being part of the non-ghosted view as the transitioned portions move across a boundary of the viewport.

19. The one or more computer-readable storage media of claim 18, wherein the texture of the ghosted view omits one or more visual features of the non-ghosted view.

20. The one or more computer-readable storage media of claim 19, wherein the one or more visual features comprise opacity, with the generating of the ghosted view comprising generating semi-transparent objects in place of opaque objects.

* * * * *